(12) United States Patent
Kim et al.

(10) Patent No.: US 9,893,772 B2
(45) Date of Patent: Feb. 13, 2018

(54) METHOD FOR CHANGING PATTERN OF REFERENCE SIGNALS ACCORDING TO COHERENCE TIME VARIATION IN WIRELESS COMMUNICATION SYSTEM AND APPARATUS THEREFOR

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELCTRONICS INC., Seoul (KR)

( * ) Notice: Subject to any disclaimer, the term of this patent is extended or adjusted under 35 U.S.C. 154(b) by 126 days.

(21) Appl. No.: 14/442,358

(22) PCT Filed: Aug. 14, 2013

(86) PCT No.: PCT/KR2013/007327
§ 371 (c)(1),
(2) Date: May 12, 2015

(87) PCT Pub. No.: WO2014/088185
PCT Pub. Date: Jun. 12, 2014

(65) Prior Publication Data
US 2016/0241308 A1 Aug. 18, 2016

Related U.S. Application Data

(60) Provisional application No. 61/733,382, filed on Dec. 4, 2012.

(51) Int. Cl.
*H04B 7/01* (2006.01)
*H04L 5/00* (2006.01)
(Continued)

(52) U.S. Cl.
CPC ............. *H04B 7/01* (2013.01); *H04B 17/104* (2015.01); *H04L 5/005* (2013.01); *H04L 5/0044* (2013.01);
(Continued)

(58) Field of Classification Search
CPC ........ H04B 7/01; H04B 17/104; H04L 5/0044
See application file for complete search history.

(56) References Cited

U.S. PATENT DOCUMENTS 7,792,201 B2 * 9/2010 Lee ....................... H04L 27/261
370/203
8,582,516 B2 * 11/2013 Chen ....................... H04B 7/02
370/329

(Continued)

FOREIGN PATENT DOCUMENTS

CN 102098084 6/2011
CN 102687413 9/2012
(Continued)

OTHER PUBLICATIONS

3GPP TSG RAN WGI Meeting #44bis, "Adaptive Inseertion of 2nd Reference Symbol for Downlink HARQ", LG Electronic.*
(Continued)

*Primary Examiner* — Rasheed Gidado
(74) *Attorney, Agent, or Firm* — Lee Hong Degerman Kang & Waimey

(57) ABSTRACT

A method for transmitting a reference signal to a user equipment at a base station in a wireless communication system is disclosed. The method includes transmitting a control channel and the reference signal having a first pattern for the control channel to the user equipment and transmitting a data channel and the reference signal having a second pattern for the data channel to the user equipment, wherein reference signal density of the second pattern is (Continued)

determined based on a coherence time of the data channel, and the first pattern includes the second pattern.

15 Claims, 13 Drawing Sheets

(51) Int. Cl.
*H04B 17/10* (2015.01)
*H04L 25/02* (2006.01)
*H04L 25/03* (2006.01)

(52) U.S. Cl.
CPC .......... *H04L 5/0048* (2013.01); *H04L 5/0051* (2013.01); *H04L 5/0053* (2013.01); *H04L 25/0204* (2013.01); *H04L 25/0224* (2013.01); *H04L 25/03898* (2013.01)

(56) References Cited

U.S. PATENT DOCUMENTS

| | | | | |
|---|---|---|---|---|
| 8,811,285 B2* | 8/2014 | Qu | ............ | H04L 5/005 370/328 |
| 8,843,142 B2* | 9/2014 | Nishio | ............ | H04L 5/0007 370/208 |
| 9,014,101 B2* | 4/2015 | Qu | ............ | H04L 5/005 370/328 |
| 9,271,272 B2* | 2/2016 | Awad | ............ | H04W 72/046 |
| 9,287,905 B2* | 3/2016 | Kim | ............ | H04L 5/0044 |
| 2004/0257979 A1* | 12/2004 | Ro | ............ | H04L 27/2613 370/208 |
| 2007/0104174 A1* | 5/2007 | Nystrom | ............ | H04L 5/0048 370/343 |
| 2009/0092194 A1* | 4/2009 | Wang | ............ | H04L 5/0051 375/260 |
| 2009/0262845 A1 | 10/2009 | Park et al. | | |
| 2009/0325585 A1* | 12/2009 | Farajidana | ............ | H04W 72/14 455/450 |
| 2010/0014481 A1 | 1/2010 | Ko et al. | | |
| 2010/0246527 A1* | 9/2010 | Montojo | ............ | H04L 25/0226 370/330 |
| 2011/0111781 A1 | 5/2011 | Chen et al. | | |
| 2012/0039287 A1 | 2/2012 | Ko et al. | | |
| 2012/0207126 A1 | 8/2012 | Qu et al. | | |
| 2013/0308567 A1* | 11/2013 | Chen | ............ | H04L 5/005 370/329 |
| 2014/0219237 A1* | 8/2014 | Charbit | ............ | H04W 72/044 370/330 |

FOREIGN PATENT DOCUMENTS

| | | |
|---|---|---|
| JP | 2006060814 A | 3/2006 |
| JP | 2006086633 A | 3/2006 |
| JP | 2009273175 A | 11/2009 |
| KR | 10-2008-0034749 | 4/2008 |

OTHER PUBLICATIONS

IEEE "UL Pilot Structure for the IEEE 802.16m" IEEE C802.16m-08/441, May 5, 2008, 7 pages.
European Patent Office Application No. 13860776.7, Search Report dated Jun. 27, 2016, 7 pages.
LG Electronics Inc., "Discussion on Quasi-co-located Antenna Ports" 3GPP TSG RAN WG1 Meeting#70, R1-123538, Aug. 13-17, 2012, 4 pages.
PCT International Application No. PCT/KR2013/007327, Written Opinion of the International Searching Authority dated Dec. 2, 2013, 9 pages.
State Intellectual Property Office of the People's Republic of China Application Serial No. 201380063255.6, Office Action dated Mar. 23, 2017, 31 pages.

* cited by examiner

E-UMTS (a) contol - plane protocol stack (b) user - plane protocol stack (a)

(b)

▨ : DM-RS Group 1

▩ : DM-RS Group 2

(a)  (b)

METHOD FOR CHANGING PATTERN OF REFERENCE SIGNALS ACCORDING TO COHERENCE TIME VARIATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2013/007327, filed on Aug. 14, 2013, which claims the benefit of U.S. Provisional Application No. 61/733,382, filed on Dec. 4, 2012, the contents of which are all hereby incorporated by reference herein in their entirety.

TECHNICAL FIELD

The present invention relates to a wireless communication system, and more particularly, to a method for changing a pattern of reference signals according to coherence time variation in a wireless communication system, and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above discussion, the present invention proposes a method for changing a pattern of reference signals according to coherence time variation in a wireless communication system, and an apparatus therefor.

Technical Solution

In accordance with an embodiment of the present invention, a method for transmitting a reference signal to a user equipment at a base station in a wireless communication system includes transmitting a control channel and the reference signal having a first pattern for the control channel to the user equipment and transmitting a data channel and the reference signal having a second pattern for the data channel to the user equipment, wherein reference signal density of the second pattern is determined based on a coherence time of the data channel and the first pattern includes the second pattern.

The method may further include receiving information about the coherence time of the data channel from the user equipment. The information about the coherence time of the data channel may include information about effective Doppler spread of the data channel. The method may further include receiving information about the second pattern from the user equipment.

The method may further include calculating effective Doppler spread of the data channel for the user equipment and determining the second pattern based on the effective Doppler spread.

In accordance with an embodiment of the present invention, a base station in a wireless communication system includes a radio communication module for transmitting and receiving signals to and from a user equipment and a processor for processing the signals, wherein the processor controls the radio communication module to transmit a control channel and the reference signal having a first pattern for the control channel to the user equipment and to transmit a data channel and the reference signal having a second pattern for the data channel to the user equipment, reference signal density of the second pattern is determined based on a coherence time of the data channel, and the first pattern includes the second pattern.

In accordance with another embodiment of the present invention, a method for receiving a reference signal from a base station at a user equipment in a wireless communication system includes receiving a control channel and the reference signal having a first pattern for the control channel from the base station and receiving a data channel and the reference signal having a second pattern for the data channel from the base station, wherein reference signal density of the second pattern is determined based on a coherence time of the data channel and the first pattern includes the second pattern.

In accordance with another embodiment of the present invention, a user equipment in a wireless communication system includes a radio communication module for transmitting and receiving signals to and from a base station and a processor for processing the signals, wherein the processor controls the radio communication module to receive a control channel and the reference signal having a first pattern for the control channel from the base station and to receive a data channel and the reference signal having a second pattern for the data channel from the base station, reference signal density of the second pattern is determined based on a coherence time of the data channel, and the first pattern includes the second pattern.

In the above embodiments, the second pattern may be defined as a hierarchical structure in which one or more reference signal symbols are eliminated from the first pattern in a time domain. The time-domain reference signal of the second pattern may be higher than time-domain reference signal density of the first pattern.

Advantageous Effects

According to the embodiments of the present invention, a base station can more efficiently transmit a reference signal for a small cell by varying a reference signal pattern according to coherence time variation in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems in accordance with the aforementioned definition. In addition, although the embodiments of the present invention will be described based on FDD mode, the FDD mode is only exemplary and the embodiments of the present invention can easily be applied to H-FDD mode or TDD mode.

Figure 1:
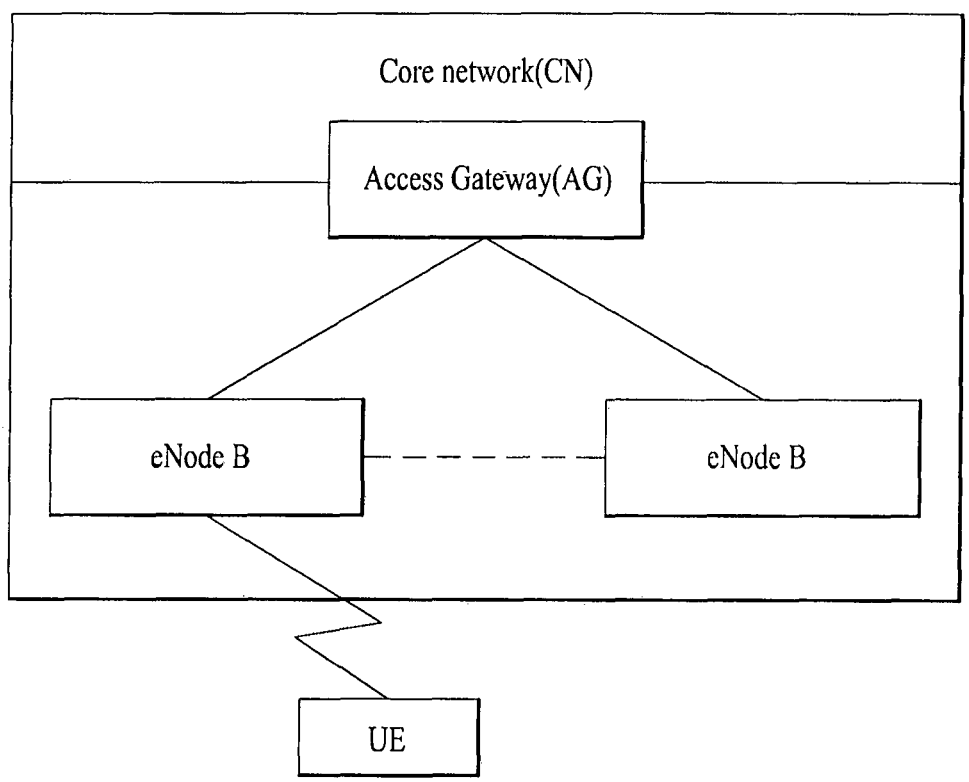
FIG. 1 is a view schematically illustrating a network structure of an E-UMTS as an exemplary radio communication system.
Figure 2:
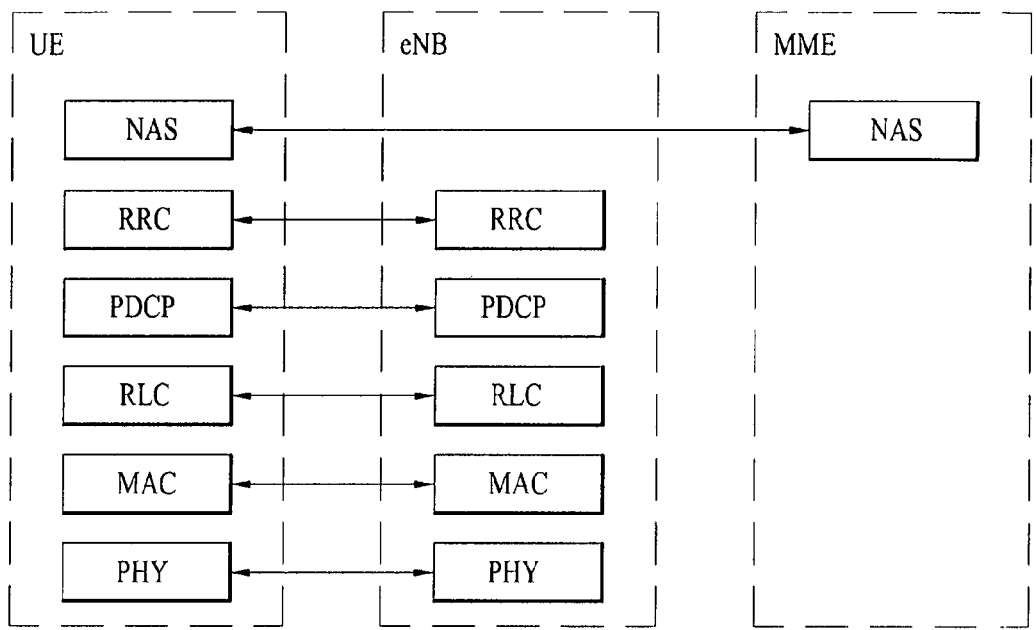
FIG. 2 is a view illustrating structures of a control plane and a user plane of a radio interface protocol between a UE and an E-UTRAN based on the 3GPP radio access network specification.
Figure 2:
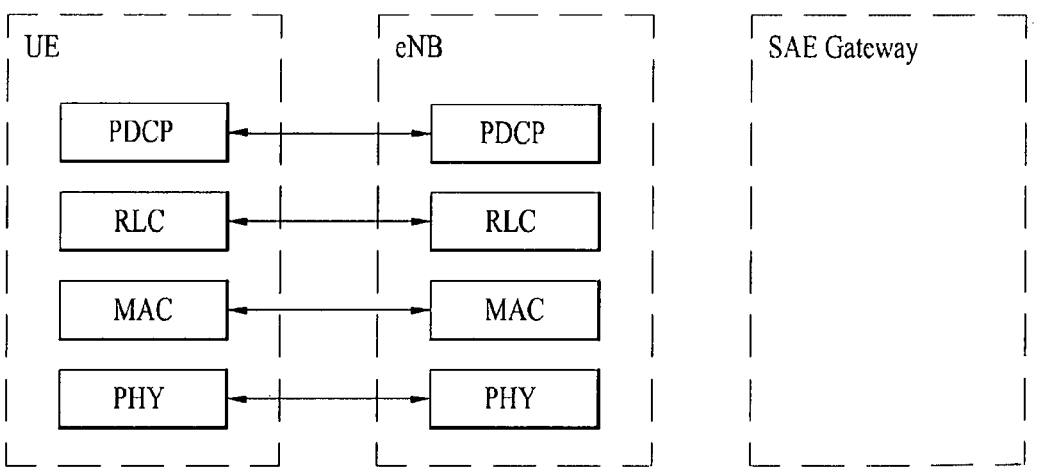

FIG. 2 is a view illustrating structures of a control plane and a user plane of a radio interface protocol between a UE and an E-UTRAN based on the 3GPP radio access network specification. The control plane refers to a path used for transmission of control messages, which are used by a UE and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.4, 3, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
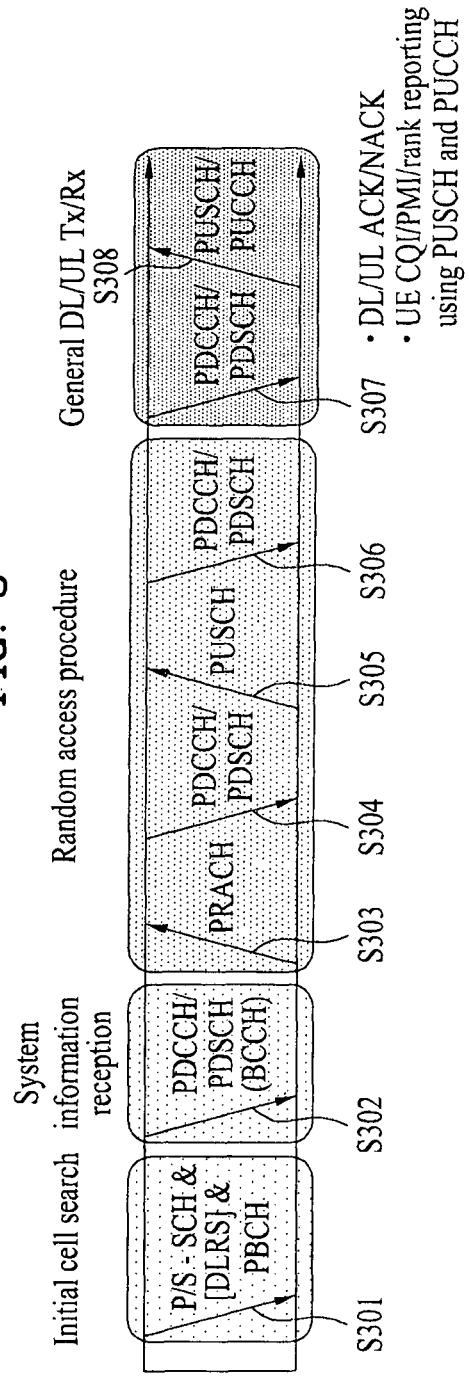
FIG. 3 is a view illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Hereinafter, a MIMO system will be described. MIMO refers to a method of using multiple transmit antennas and multiple receive antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 4:
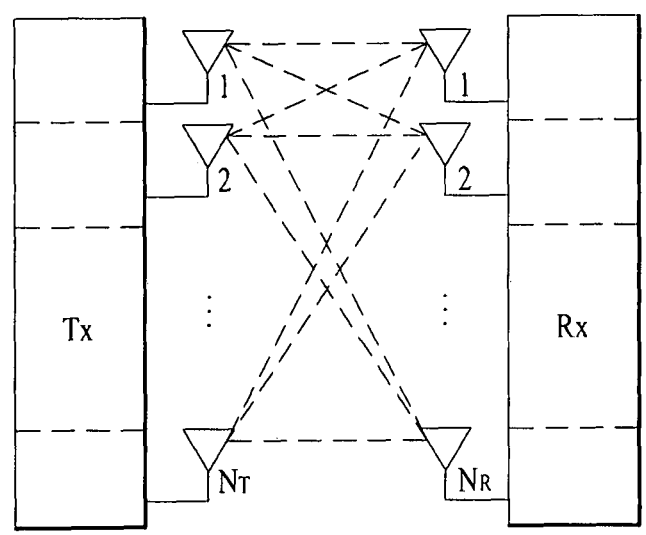
FIG. 4 is a view illustrating the configuration of a MIMO communication system.

The configuration of a MIMO communication system described in the present invention is shown in FIG. 4. A transmitting end is equipped with $N_T$ transmit (Tx) antennas and a receiving end is equipped with $N_R$ receive (Rx) antennas. If a plurality of antennas is used both at the transmitting end and at the receiving end, theoretical channel transmission capacity increases unlike the case in which only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where Ri is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in capacity provided by the MIMO system was first demonstrated in the mid-1990s, various techniques for substantially improving data transfer rate have been under development. Several of these techniques have already been incorporated into a variety of wireless communication standards including, for example, third generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 4, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2.

$$s=[s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7.

$$\text{\# of streams} \leq \text{rank}(H) \leq \min(N_T, N_R) \quad \text{[Equation 7]}$$

Here, '# of streams' denotes the number of streams. It should be noted that one stream may be transmitted through one or more antennas.

There may be various methods of allowing one or more streams to correspond to multiple antennas. These methods may be described as follows according to types of MIMO technology. The case in which one stream is transmitted via multiple antennas may be called spatial diversity, and the case in which multiple streams are transmitted via multiple antennas may be called spatial multiplexing. It is also possible to configure a hybrid of spatial diversity and spatial multiplexing.

Figure 5:
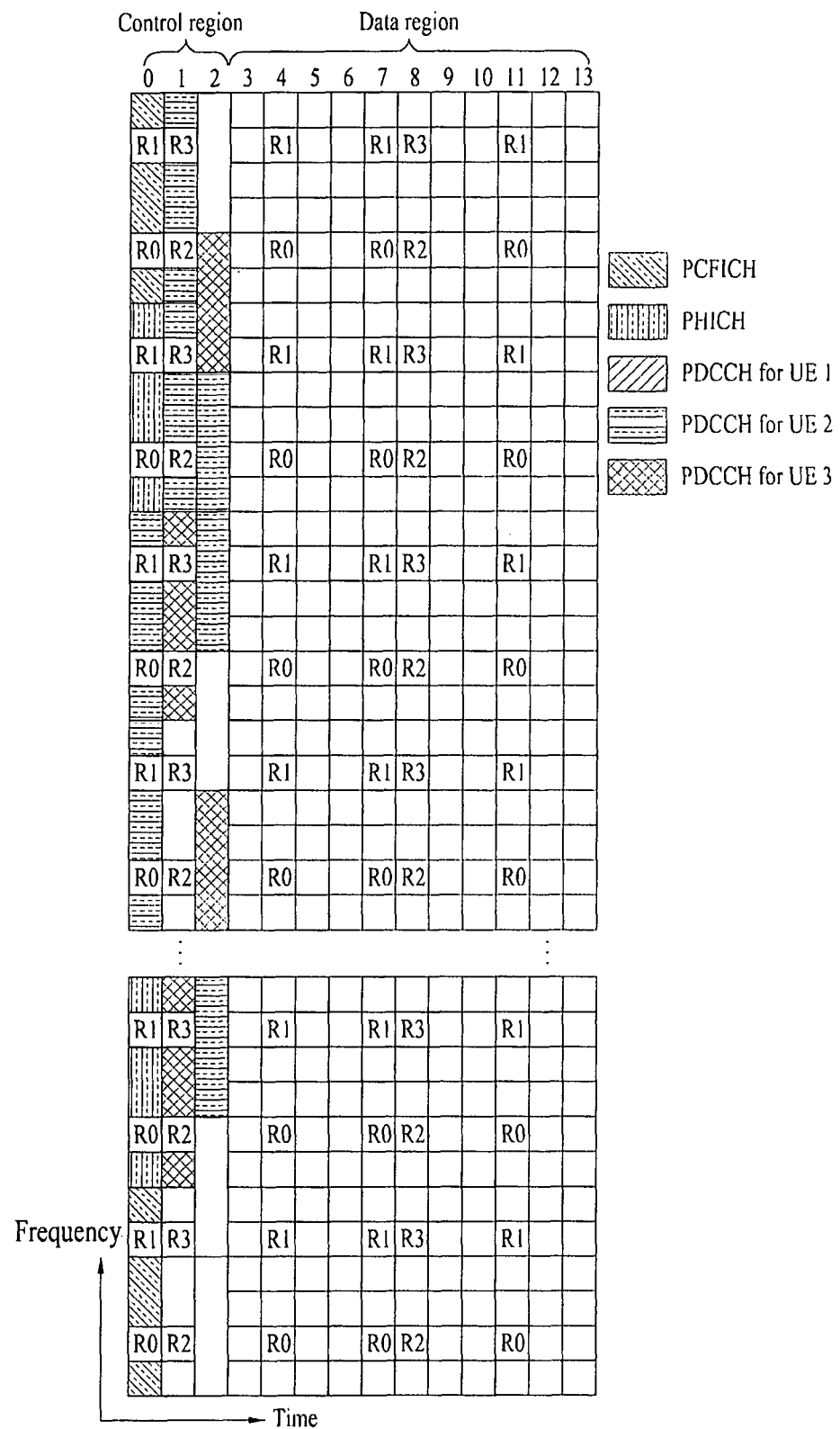
FIG. 5 is a view illustrating the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to a subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A' and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
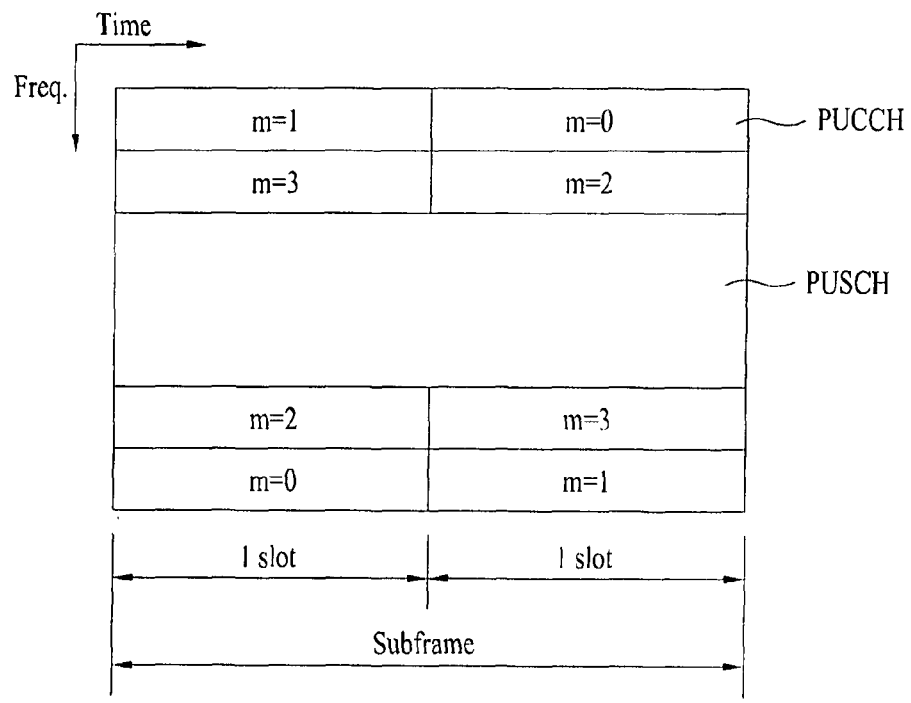
FIG. 6 is a view illustrating the structure of an uplink subframe used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one Resource Block (RB) in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

With the emergence and widespread use of various devices requiring Machine-to-Machine (M2M) communication and high transmission rate, data requirements for a cellular network in current wireless communication environments have rapidly increased. To meet required high data transmission rate, communication technology has developed into carrier aggregation technology for efficiently using more frequency bands, MIMO technology for raising data capacity in a limited frequency, and multi-BS cooperative technology. In addition, communication environments have evolved into increasing density of accessible nodes in the vicinity of a user. A system equipped with nodes with high density may have higher system performance by cooperation between nodes. Such a scheme provides much better performance than a non-cooperation scheme in which each node operates as an independent Base Station (BS), Advanced BS (ABS), Node-B (NB), eNode-B (eNB), or Access Point (AP).

The node may be implemented in the form of, for example, a Remote Radio Head (RRH) or an antenna node of a Distributed Antenna System (DAS). The DAS refers to a system for causing a single BS to manage antennas distributed at various locations in a cell, unlike a Centralized Antenna System (CAS) in which antennas are centralized in a cell. The DAS is also different from a femto/pico cell in that multiple antenna nodes constitute one cell.

In the initial stages, the DAS was used to repeatedly transmit signals by further installing antennas to cover a shadow area. However, the DAS may be considered a sort of a MIMO system because BS antennas can support one or plural users by simultaneously transmitting and receiving multiple data streams. Due to high frequency efficiency, the MIMO system has been recognized as an indispensable factor for satisfying requirements of next-generation communication. From the viewpoint of the MIMO system, the DAS has more advantages than the CAS, such as high power efficiency obtained by decrease in the distance between a user and an antenna, high channel capacity caused by low correlation and interference between BS antennas, and communication performance of relatively uniform quality irrespective of location of a user in a cell.

Figure 7:
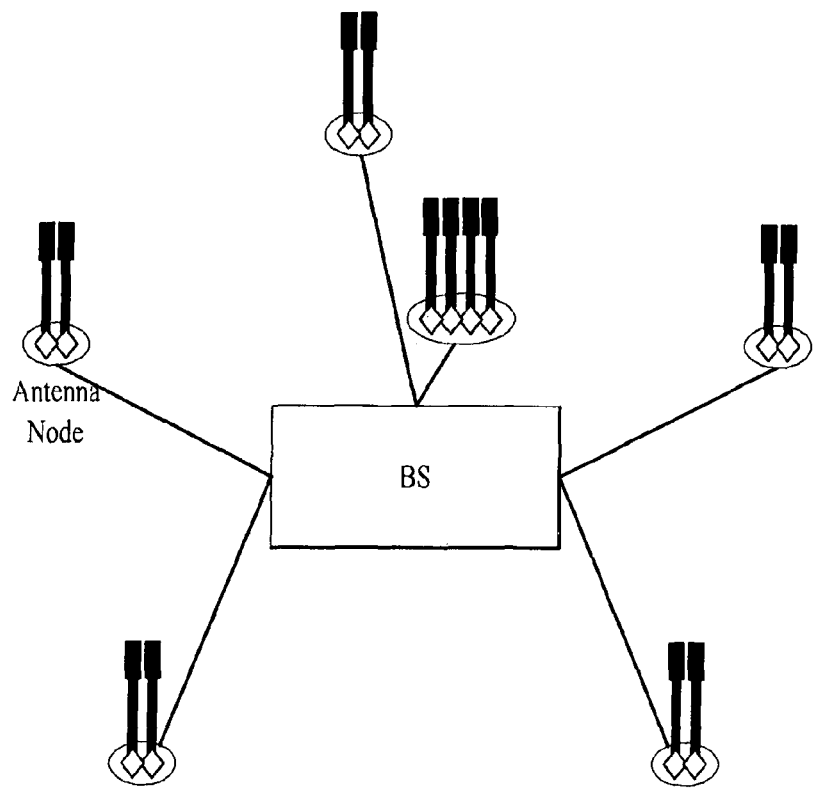
FIG. 7 is a view illustrating the configuration of a DAS in a next-generation communication system.

FIG. 7 is a view illustrating the configuration of a DAS in a next-generation communication system.

Referring to FIG. 7, the DAS includes a BS and antenna nodes connected to the BS. The antenna nodes are connected to the BS by wire or wirelessly. Each of the antenna nodes may include one to several antennas. Generally, antennas belonging to one antenna node have characteristics that the distance between the nearest antennas is less than a few meters and, therefore, the antennas belong to the same regional spot. An antenna node serves as an AP that a UE can access. In a conventional DAS, generally, no distinction is made between an antenna node and an antenna, as the antenna node and the antenna are treated the same. In actuality, however, the relationship between the antenna node and the antenna should certainly be defined to efficiently manage the DAS.

Figure 8:
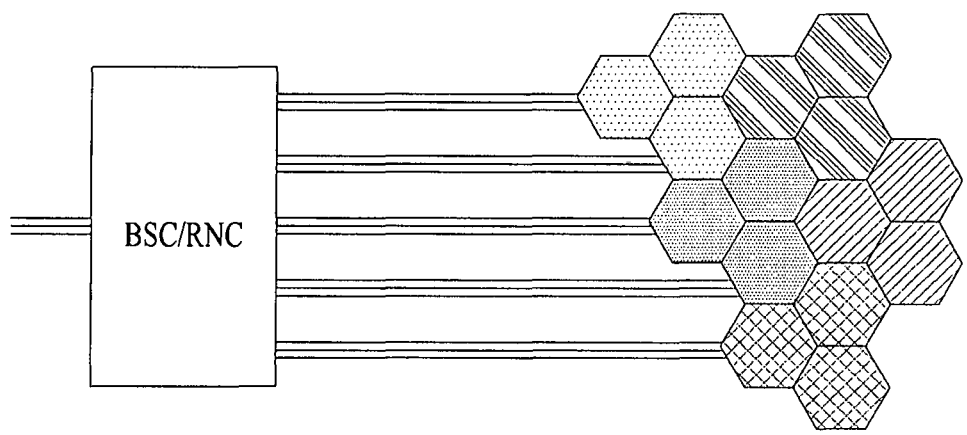
FIG. 8 is a view illustrating the concept of a BTS hotel in a DAS.
Figure 8:
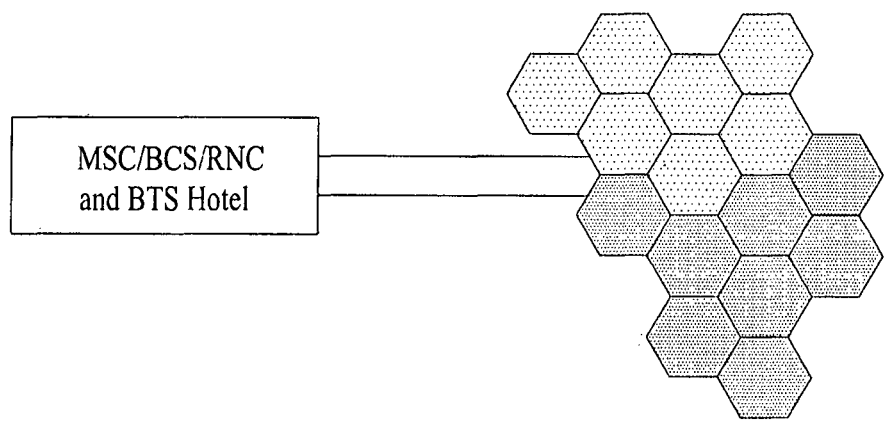

FIG. 8 is a view illustrating the concept of a Base Transceiver Station (BTS) hotel in a DAS.

FIG. 8(a) illustrates a conventional cellular system. As shown, one BTS manages three sectors and each BTS is connected to a Base Station Controller (BSC)/Radio Network Controller (RNC) through a backbone network.

However, in the DAS as shown in FIG. 8(b), BTSs connected to each antenna node are gathered in one place. This is referred to as a BTS hotel. In this system, costs for land and buildings in which the BTSs are to be installed can be reduced and maintenance and management for the BTS can be easily carried out in one place. In addition, backhaul capacity can be greatly increased by installing the BTS and the Mobile Station Center (MSC)/BSC/RNC in one place.

Figure 9:
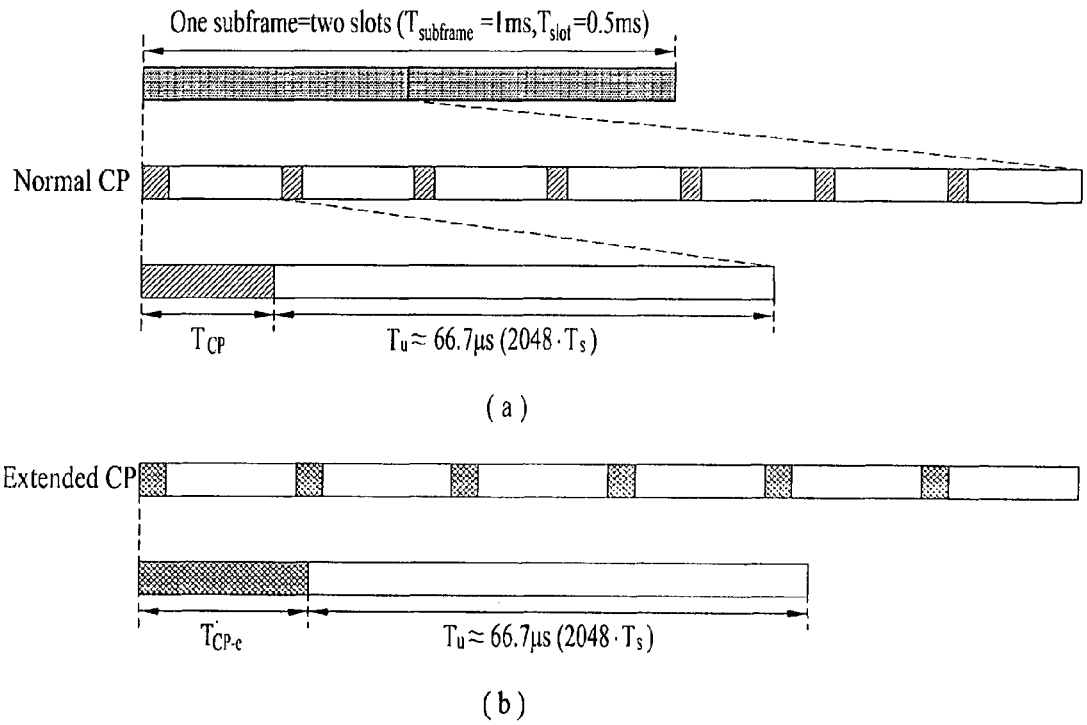
FIG. 9 is a view illustrating the structure of a frame used in a legacy LTE system.

FIG. 9 illustrates the structure of a frame used in a legacy LTE system. More specifically, FIG. 9(a) illustrates the frame in a normal Cyclic Prefix (CP) and FIG. 9(b) illustrates the frame in an extended CP.

In the LTE system, two types of frame structures are supported as illustrated in FIG. 9. This is for the LTE system to support various scenarios of a cellular system. Actually, the LTE system covers environments of an indoor cell, an urban cell, a suburban cell, and a rural cell and supports movement speed of a UE up to 350 to 500 km. A center frequency operating in the LTE system is generally 400 MHz to 4 GHz and an available frequency bandwidth is 1.4 to 20 MHz. This means that delay spread and Doppler frequency may differ according to the center frequency and the available frequency bandwidth.

Referring to FIG. 9, a radio frame is 10 ms ($327200 \times T_S$) in length and includes 10 equal-sized subframes. Each subframe is 1 ms in length and includes two slots each being 0.5 ms (15360×$T_S$) long. Here, $T_S$ denotes sampling time expressed as $T_S$=1/(15 kHZ×2048)=3.2552×10$^{-8}$≈33 ns.

Meanwhile, in case of a normal CP, CP length $T_{CP}$ is 160×$T_S$, i.e. 5.1 μs, in the first symbol, whereas CP length $T_{CP}$ is 144×$T_S$, i.e. 4.7 μs, in the other symbols with a subcarrier spacing Δf of 15 kHz. However, in case of an extended CP, although the subcarrier spacing Δf is 15 kHz, which is the same as in the normal CP, CP length $T_{CP-e}$ is 512×$T_S$, i.e. about 16.7 μs.

Accordingly, the extended CP may support a relatively wide suburban cell or rural cell due to long CP length. Generally, delay spread is increased in a suburban cell or rural cell and, therefore, the extended CP having a relatively long duration is needed to certainly solve Inter Symbol Interference (ISI). However, there is a trade-off at which loss of frequency efficiency/transmission resources is generated due to relative increase of overhead.

Hereinafter, a reference signal will be described in more detail.

Generally, to measure a channel, a Reference Signal (RS) known to a transmitting side and a receiving side is transmitted together with data from the transmitting side to the receiving side. Such an RS serves to perform a demodulation process by indicating a modulation scheme as well as channel measurement. The RS is classified into a dedicated RS (DRS), i.e. a UE-specific RS, for a BS and a specific UE and a Common RS, i.e. Cell-Specific RS (CRS), for all UEs in a cell. The CRS includes an RS for reporting a measurement result for CQI/PM/RI measured in a UE to a BS and this RS is referred to as a Channel State Information-RS (CSI-RS).

Figure 10:
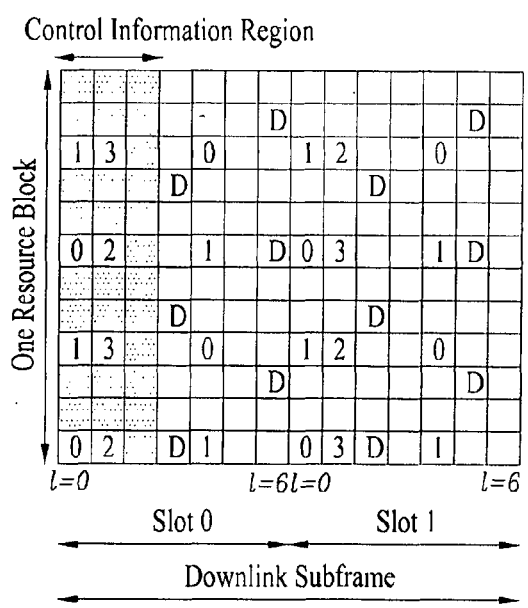
FIG. 10 and FIG. 11 are views illustrating the structure of downlink RSs in an LTE system supporting downlink transmission using four antennas.
Figure 11:
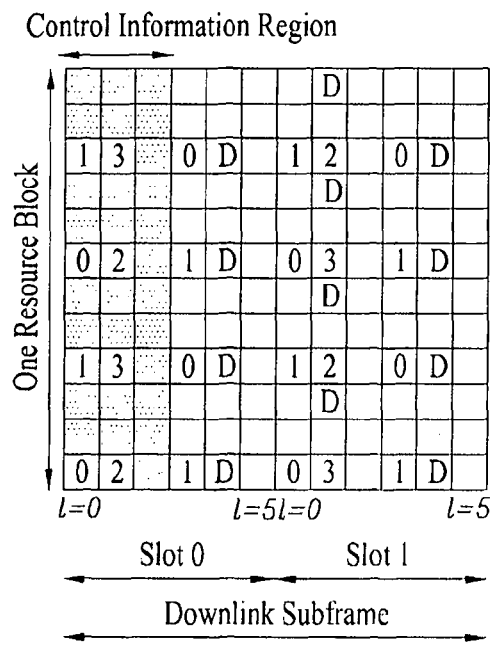

FIG. 10 and FIG. 11 are views illustrating the structure of RSs in an LTE system supporting downlink transmission using four antennas. Specifically, FIG. 10 illustrates the structure of the RS in a normal CP and FIG. 11 illustrates the structure of the RS in an extended CP.

Referring to FIGS. 10 and 11, numbers 0 to 3 denoted in lattices indicate CRSs, i.e. cell-specific RSs, transmitted for channel measurement and data demodulation in correspondence to antenna ports 0 to 3, respectively. The CRSs may be transmitted to the UE in all control information regions as well as in data information regions.

In addition, 'D's denoted in lattices indicate downlink Demodulation-RSs (DM-RSs) which are UE-specific RSs. The DM-RSs support transmission of a single antenna port through a data region, i.e. through a PDSCH. Whether or not the DM-RS, which is a UE-specific RS, is present is signaled to the UE through higher layers. In FIGS. 10 and 11, DM-RSs corresponding to an antenna port 5 are illustrated. In the 3GPP standard document 36.211, DM-RSs for a total of 8 antenna ports, from an antenna port 7 to an antenna port 14, are defined.

Figure 12:
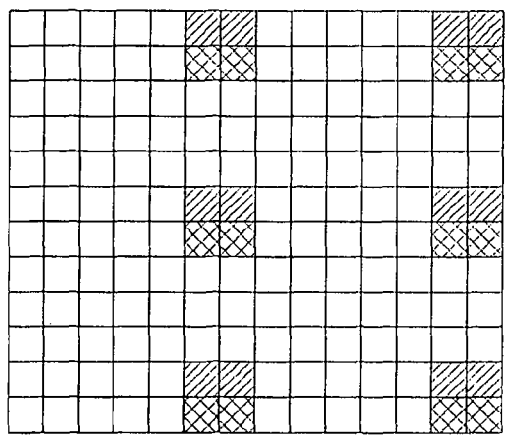
FIG. 12 illustrates an example of downlink DM-RS allocation defined in a current 3GPP standard document.

FIG. 12 illustrates an example of downlink DM-RS allocation defined in the current 3GPP standard document.

Referring to FIG. 12, DM-RSs corresponding to antenna ports {7, 8, 11, 13} are mapped using a sequence per antenna port in a DM-RS group 1. DM-RSs corresponding to antenna ports {9, 10, 12, 14} are also mapped using a sequence per antenna port in a DM-RS group 2.

Meanwhile, the above-described CSI-RS has been proposed for the purpose of channel measurement for a PDSCH, separately from the CRS. Unlike the CRS, the CSI-RS may be defined as a maximum of 32 different CSI-RS configurations to reduce Inter-Cell Interference (ICI) in a multi-cell environment.

A CSI-RS configuration varies according to the number of antenna ports. CSI-RSs configured as differently as possible between neighboring cells are defined. The CSI-RS supports a maximum of 8 antennas unlike the CRS. In the 3GPP standard document, a total of 8 antennas, from an antenna port 15 to an antenna port 22, is allocated as antenna ports for the CSI-RS. The following Table 1 and Table 2 show CSI-RS configurations defined in the 3GPP standard document. Specially, Table 1 shows CSI-RS configurations in a normal CP and Table 2 shows CSI-RS configurations in an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |

TABLE 1-continued

|  | | Number of CSI reference signals configured | | | | |
|---|---|---|---|---|---|---|
| CSI reference signal | | 1 or 2 | | 4 | | 8 |
| configuration | (k', l') | $n_s$ mod 2 | (k', l') | $n_s$ mod 2 | (k', l') | $n_s$ mod 2 |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| | | | Number of CSI reference signals configured | | | | |
|---|---|---|---|---|---|---|---|
| | CSI reference signal | | 1 or 2 | | 4 | | 8 |
| | configuration | (k', l') | $n_s$ mod 2 | (k', l') | $n_s$ mod 2 | (k', l') | $n_s$ mod 2 |
| Frame structure type 1 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 13:
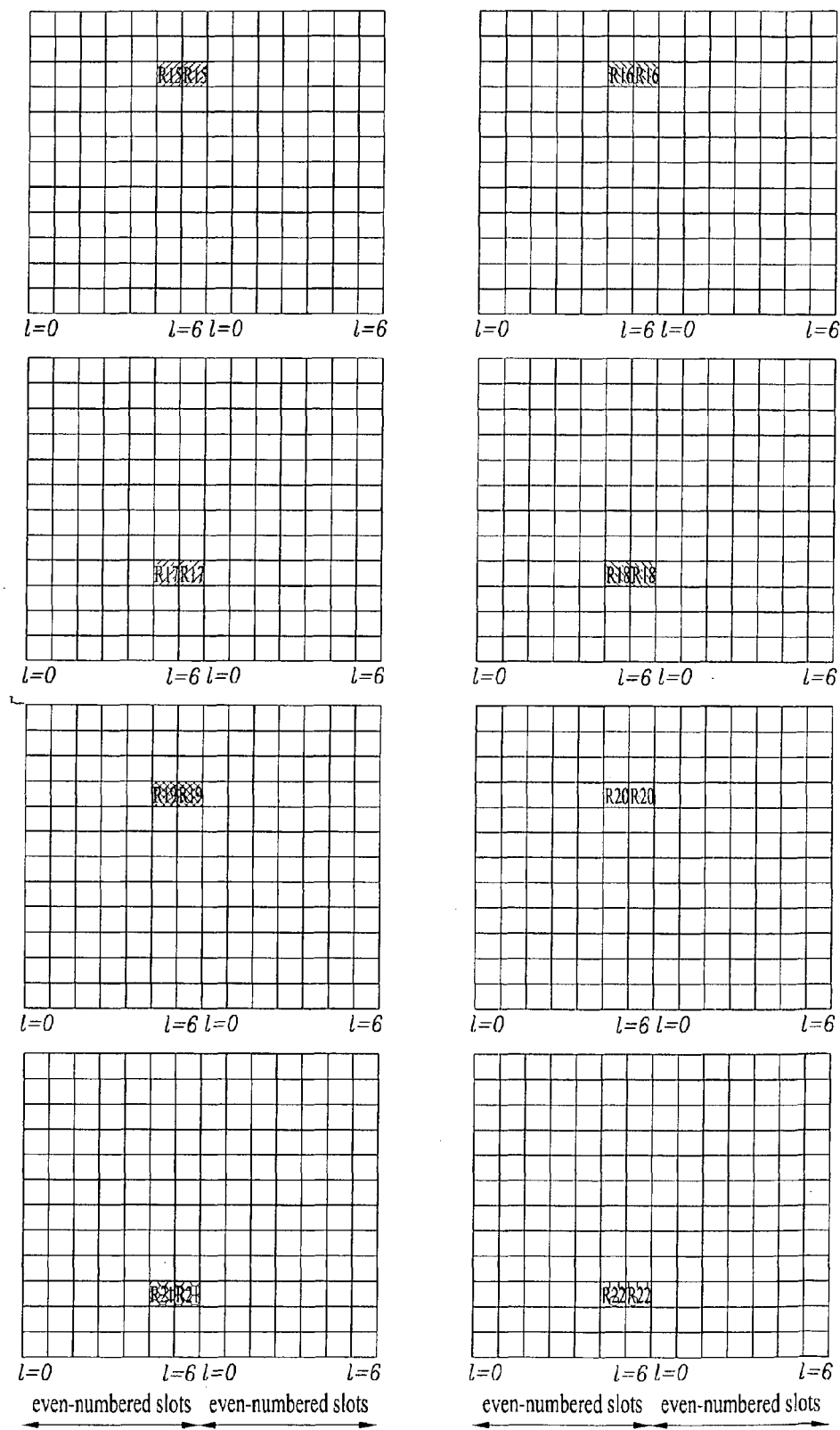
FIG. 13 illustrates CSI-RS configuration #0 in a normal CP among downlink CSI-RS configurations defined in the current 3GPP standard document.

In Table 1 and Table 2, (k',l') denotes an RE index, k' denotes a subcarrier index, and l' denotes an OFDM symbol index. FIG. 13 illustrates CSI-RS configuration #0 in a normal CP among CSI-RS configurations defined in the current 3GPP standard document.

In addition, a CSI-RS subframe configuration may be defined. The CSI-RS subframe configuration is represented by a periodicity $T_{CSI-RS}$ and a subframe offset $\Delta_{CS-RS}$, expressed in subframes. The following Table 3 indicates CSI-RS subframe configurations defined in the 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

For a future LTE system, introduction of a local area has been considered. That is, to intensify service support per user, new cell deployment of the concept of local area access is expected to be introduced.

Figure 14:
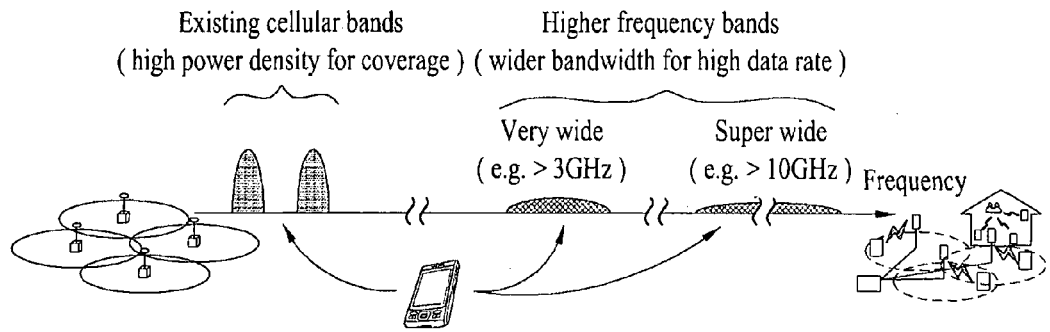
FIG. 14 is a view illustrating the concept of a small cell which is expected to be introduced in a future LTE system.

FIG. 14 is a view illustrating the concept of a small cell which is expected to be introduced in a future LTE system.

Referring to FIG. 14, it is expected to configure a wider system bandwidth in a frequency band having a higher center frequency rather than in a frequency band operating in a legacy LTE system. Basic cell coverage is supported based on a control signal such as system information through an existing cellular band and, in a small cell of a higher frequency band, data transmission for maximizing transmission efficiency may be performed using a wider frequency bandwidth. Accordingly, in the concept of local area access, target UEs may correspond to UEs having low to medium mobility located at a narrower area and target cells may correspond to small cells in which the distance between the UE and the BS is a few hundred meters which is shorter than an existing cell of a few kilometers.

In these cells, the distance between the UE and the BS is short and a high frequency band is used. As a result, the following channel characteristics may be expected.

First, in an aspect of delay spread, a signal delay may be shortened as the distance between the BS and the UE decreases. Additionally, in an aspect of a subcarrier spacing, when an OFDM-based frame, which is the same as in the LTE system, is applied, a much larger value than an existing 15 KHz may be set as the subcarrier spacing because an assigned frequency band is relatively large. Last, in an aspect of a Doppler frequency, a higher Doppler frequency at the same movement speed of a UE is obtained due to use of a high frequency band and, thus, a coherence time may be remarkably shortened. The coherence time refers to a time duration during which channels have static or uniform characteristics over time. A coherence bandwidth refers to bandwidth in which channels show static or uniform characteristics over time.

Meanwhile, in a legacy LTE system, the density and pattern of RSs have been designed based on the coherence time derived from a maximum Doppler frequency. Through this, the UE may perform channel estimation and received data demodulation. Actually, assuming that a center frequency is 2 GHz and the movement speed of the UE is 500 km/h in the LTE system, a maximum Doppler frequency is 950 Hz, i.e. about 1000 Hz. Generally, the coherence time can be obtained from 50% of the inverse of the maximum Doppler frequency. Accordingly, the relationship such as Equation 8 may be satisfied in the LTE system.

$$T_C = \frac{1}{2f_d} \cong 0.5 \text{ ms} \qquad \text{[Equation 8]}$$

In Equation 8, $T_C$ denotes a coherence time and $f_d$ denotes a Doppler frequency. This relationship may mean that a maximum of two RSs is needed within the coherence time and further mean that channel estimation is possible in all mobile situations up to a maximum movement speed of the UE, i.e. 500 km/h, through such an RS pattern.

However, in a high frequency band having a center frequency of a few tens of GHz, even a relatively low-speed UE may experience a high Doppler frequency. For example, if a center frequency $f_c$ is 2 GHz and 20 GHz and a UE movement speed v is 30 km/h, i.e. (30/3600) km/s, then a maximum Doppler frequency $f_d$ may be expressed by the following Equation 9 and Equation 10. In Equation 9 and Equation 10, c is $3 \times 10^8$ m/s, the speed of light in a vacuum.

$$f_d = \frac{v}{c} \times f_c = \frac{(30 \times 10^3)/3600}{3 \times 10^8} \times (2 \times 10^9) = 55.6 \text{ Hz} \qquad \text{[Equation 9]}$$

$$f_d = \frac{v}{c} \times f_c = \frac{(30 \times 10^3)/3600}{3 \times 10^8} \times (20 \times 10^9) = 556 \text{ Hz} \qquad \text{[Equation 10]}$$

In addition, due to the nature of a high frequency band, a varied characteristic and a direct compensation scheme may be applied to a Doppler spectrum, unlike a few existing channels. In the high frequency band, since a wavelength λ constituting an antenna element generally becomes short, massive antennas may be configured to contain many antennas in the same space and it may be easy to apply a narrow beamforming scheme through the massive antennas.

Further, due to a high center frequency of a few tens of GHz, greater path loss than in a basic frequency of a few GHz is generated and additional path loss is also generated due to the nature of the high frequency band. Accordingly, since additional path attenuation of components reflected through scattering among existing multipath channels is relatively significant, an environment in which a BS can easily apply the narrow beamforming scheme is provided.

Figure 15:
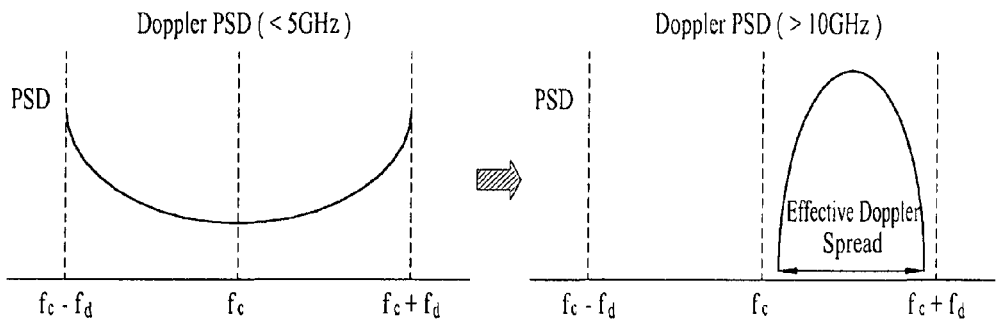
FIG. 15 is a view illustrating Doppler spectrum distribution during narrow beamforming in a high frequency band.

Since narrow beamforming allows a receiver of a UE to receive signals only in a specific direction rather than in all directions, a relatively sharp Doppler spectrum is obtained as illustrated in FIG. 15.

FIG. 15 is a view illustrating Doppler spectrum distribution during narrow beamforming in a high frequency band. Specifically, FIG. 15 is a view comparing a general frequency band less than 5 GHz with a high frequency band greater than 10 GHz. In FIG. 15, Power Spectral Density (PSD) indicates power distribution of a signal according to a frequency and expresses a probability density function of a Doppler signal.

In the case in which characteristics of a Doppler spectrum considering narrow beamforming are used, the spectrum is not Doppler-spread over all regions but condensed in a partial region. Accordingly, the receiver may reduce a final Doppler frequency as shown in FIG. 16, using an Automatic Frequency Control or Adaptive Frequency Control (AFC) function.

Figure 16:
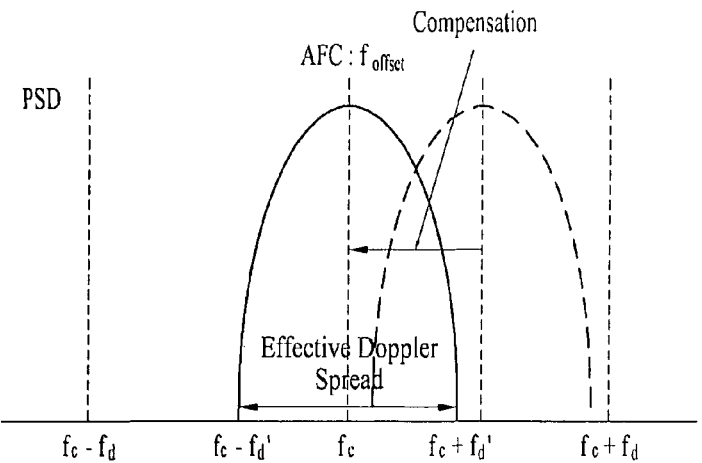
FIG. 16 is a view conceptually illustrating reduction of a Doppler frequency using an AFC function during narrow beamforming in a high frequency band.

FIG. 16 is a view conceptually illustrating reduction of a Doppler frequency using an AFC function during narrow beamforming in a high frequency band.

Referring to FIG. 16, it may be appreciated that a maximum Doppler frequency $f_d$ is reduced to $f_d'(<f_d)$ through the AFC function. Furthermore, referring to the afore-mentioned Equation 8, since the maximum Doppler frequency and the coherence time are inversely proportional, reduction of the maximum Doppler frequency means increase of the coherence time. This represents that a channel is invariant in the time domain for a longer time.

As described above, during narrow beamforming in a high frequency band, a coherence time increases through the AFC function. In the present invention, an RS pattern deployment method capable of dynamically coping with coherence time variation is proposed.

First Embodiment

The first embodiment of the present invention proposes defining RS patterns in which RS density in the time domain differs with respect to a control channel and a data channel. It is assumed that the control channel and the data channel are different at different TTIs as opposed to a legacy LTE system.

The control channel basically includes information that should be commonly received by all UEs. If a signal is beamformed for a specific UE, the other UEs cannot receive corresponding information. Due to such a characteristic, application of narrow beamforming to the control channel is undesirable. Accordingly, it is preferable to define time-domain RS density based on a coherence time corresponding to an existing Doppler spectrum.

On the other hand, narrow beamforming is easily applied to the data channel because the data channel includes information transmitted only for a specific UE. Hence, time-domain RS density considering reduced effective Doppler spread may be defined. As a coherence time increases, since channel estimation may be performed using even less time-domain RS symbols, the data channel requires less time-domain RS density than the control channel.

For example, assuming that maximum movement speed of a UE or maximum movement speed as defined in a standard is 120 km/h, a maximum Doppler frequency $f_d$ and a minimum coherence time $T_C$ of a corresponding channel may be calculated as indicated by the following Equation 11 and Equation 12, respectively. Here, it is assumed that a center frequency $f_c$ is 30 GHz and C is $3 \times 10^8$, the speed of light in a vacuum.

Maximum Doppler frequency $$f_d = \frac{v}{c} \times f_c = \frac{(120 \times 10^3)/3600}{3 \times 10^8} \times (30 \times 10^9) = 3333.3 \text{ Hz} \quad \text{[Equation 11]}$$

Minimum coherence time $$T_C = \frac{1}{2f_d} \cong 0.15 \text{ ms} \quad \text{[Equation 12]}$$

If an effective Doppler frequency is reduced to ½ by applying narrow beamforming and AFC, a coherence time of a corresponding data channel may be defined as expressed by the following Equation 13.

$$T_C = \frac{1}{2f'_d} \cong 0.3 \text{ ms (where, } f'_d = f_d/2) \quad \text{[Equation 13]}$$

In addition, to accurately perform channel estimation irrespective of each movement speed of the UE, since at least two RS symbols are needed in the coherence time, the number of RSs per subframe or basic channel estimation time unit may be reversely calculated.

For example, if the basic channel estimation time unit is 1 ms corresponding to one subframe, required RS density may be defined as indicated by Equation 14

Requied RS density = [Equation 14]

$$\left\lceil \frac{TTI}{T_C} \right\rceil \times \text{(the numder of required } RSs\text{)}$$

Figure 17:
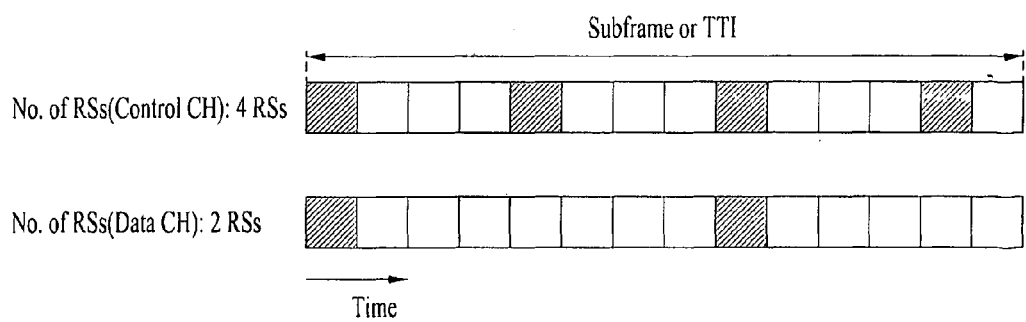
FIG. 17 is a view illustrating required RS density for a control channel and a data channel according to a first embodiment of the present invention.

FIG. 17 is a view illustrating required RS density for a control channel and a data channel according to a first embodiment of the present invention.

Referring to FIG. 17, required RS density for the control channel and required RS density for the data channel according to Equation 14 may be calculated as indicated by Equation 15 and Equation 16, respectively.

RS density for control channel = [Equation 15]

$$\left\lceil \frac{1 \text{ ms}}{0.15 \text{ ms}} \right\rceil \times (2\text{RS\_symbol}) =$$

$$7 \times 2 = 14 \ RS \text{ symbols per } TTI$$

RS density for data channel = $\left\lceil \frac{1 \text{ ms}}{0.3 \text{ ms}} \right\rceil \times (2\text{RS\_symbol}) =$ [Equation 16]

$$4 \times 2 = 8 \ RS \text{ symbols per } TTI$$

Figure 18:
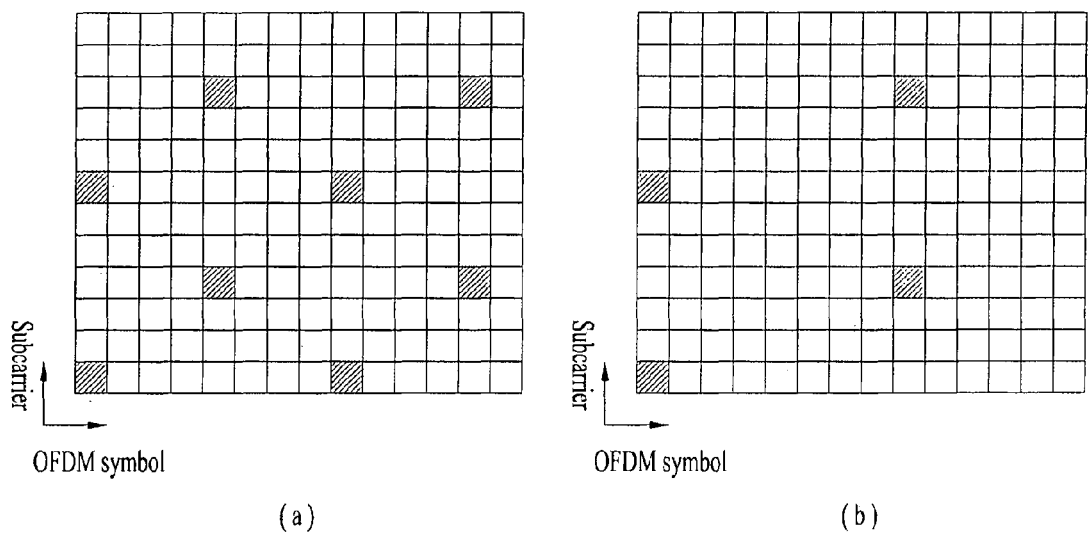
FIG. 18 is a view illustrating RS patterns for a control channel and a data channel according to a first embodiment of the present invention.

Consequently, in the part of the UE, it is possible to demodulate the data channel at the same movement speed even though a pattern having less time-domain RS density is used, in consideration of reduced Doppler spread. Meanwhile, RS density in the frequency domain is determined according to channel characteristics, i.e. coherence bandwidth FIG. 18 is a view illustrating RS patterns for a control channel and a data channel according to a first embodiment of the present invention. Specifically, FIG. 18(a) illustrates an RS pattern for a control channel and FIG. 18(b) illustrates an RS pattern for a data channel.

Second Embodiment

Meanwhile, RS patterns for a control channel and a data channel may be configured in a form of eliminating prescribed RS REs from a basic structure, i.e. in a form having a hierarchical structure, rather than in a form of an independent RS pattern. That is, a BS may define a basic RS pattern considering Doppler spread of the control channel and, if Doppler spread of the data channel is decreased using narrow beamforming and ACF, the BS may configure a variable RS pattern using a method of eliminating prescribed RSs from the basic RS pattern according to a decreased level of a Doppler frequency of the data channel.

For example, if required time-domain RS density based on the control channel is L per TTI, time-domain RS density according to the decreased level of Doppler spread of the data channel may be configured to be decreased to L-a or L-a-b per TTL.

Third Embodiment

Next, a method may be considered in which the BS determines an RS pattern per UE or per cell using effective Doppler spread information fed back from one or more UEs and transmits and transmits information about the determined RS pattern to the UE.

To this end, the UE should estimate Doppler spread thereof and calculate effective Doppler spread by applying frequency compensation based on the estimated Doppler spread. The UE configures feedback information based on the effective Doppler spread and transmits the feedback information to the BS. The BS may configure an RS pattern suitable for the UE based on the feedback information received from the UE and transmit information about the RS pattern configuration to the UE. Specifically, the feedback information may include a recalculated movement speed value based on the effective Doppler spread, a movement speed level obtained by quantizing the recalculated movement speed value, or a normalized Doppler frequency, i.e. $f_d/\Delta f$, using a subcarrier spacing $\Delta f$.

Meanwhile, the UE may select a preferred RS pattern using the effective Doppler spread and transmit information about the preferred RS pattern to the BS. During selection of the preferred RS pattern, the UE may use the recalculated movement speed value based on the effective Doppler spread, the movement speed level obtained by quantizing the recalculated movement speed value, or the normalized Doppler frequency $f_d/\Delta f$ using a subcarrier spacing.

Additionally, if the above-described RS is a DM-RS used for data demodulation of the UE, it is possible to configure a UE-specific RS pattern. However, a UE-group-specific RS pattern or a cell-specific RS pattern may be configured according to a specific purpose such as control channel transmission or broadcast information transmission.

Fourth Embodiment

Last, the BS may estimate/predict the effective Doppler spread of the UE by itself and define an RS pattern per UE or per cell using information about the effective Doppler spread. That is, to determine an RS pattern without feedback of the UE, the BS may directly estimate an AFC range of the UE, configure an RS pattern of low RS density capable of maximizing resource efficiency during data channel transmission, and transmit information about the RS pattern configuration to the UE.

Similarly, if the above-described RS is a DM-RS used for data demodulation of the UE, it is possible to configure a UE-specific RS pattern. However, a UE-group-specific RS pattern or a cell-specific RS pattern may be configured according to a specific purpose such as control channel transmission or broadcast information transmission.

Figure 19:
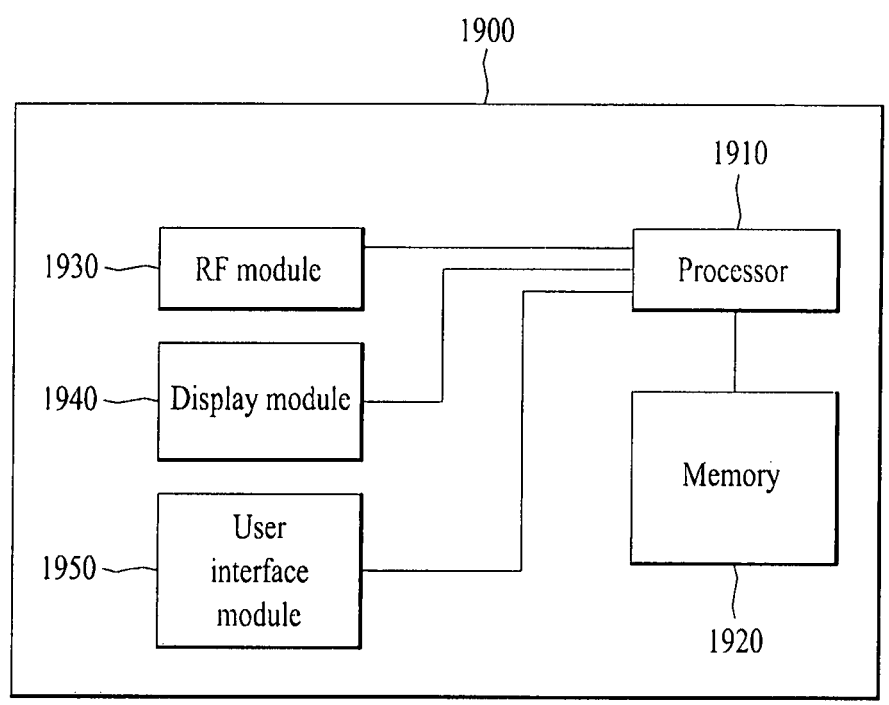
FIG. 19 is a block diagram illustrating a communication apparatus according to an embodiment of the present invention.

FIG. 19 is a block diagram illustrating a communication apparatus according to an embodiment of the present invention.

Referring to FIG. 19, a communication device 1900 includes a processor 1910, a memory 1920, a Radio Frequency (RF) module 1930, a display module 1940, and a user interface module 1950.

The communication device 1900 is illustrated for convenience of the description and some modules may be omitted. Moreover, the communication device 1900 may further include necessary modules. Some modules of the communication device 1900 may be further divided into sub-modules. The processor 1900 is configured to perform operations according to the embodiments of the present invention exemplarily described with reference to the figures. Specifically, for the detailed operations of the processor 1900, reference may be made to the contents described with reference to FIGS. 1 to 18.

The memory 1920 is connected to the processor 1910 and stores operating systems, applications, program code, data, and the like. The RF module 1930 is connected to the processor 1910 and performs a function of converting a baseband signal into a radio signal or converting a radio signal into a baseband signal. For this, the RF module 1930 performs analog conversion, amplification, filtering, and frequency upconversion or inverse processes thereof. The display module 1940 is connected to the processor 1910 and displays various types of information. The display module 1940 may include, but is not limited to, a well-known element such as a Liquid Crystal Display (LCD), a Light Emitting Diode (LED), or an Organic Light Emitting Diode (OLED). The user interface module 1950 is connected to the processor 1910 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for changing a pattern of reference signals according to coherence time variation in a wireless communication system and the apparatus therefor have been described centering on an example applied to the 3GPP LTE system, the present invention is applicable to a variety of wireless communication systems in addition to the 3GPP LTE system.

The invention claimed is:

1. A method for transmitting a reference signal to a user equipment (UE) at a base station (BS) in a wireless communication system, the method comprising:
transmitting a control channel and the reference signal having a first pattern for the control channel to the UE; and
transmitting a data channel and the reference signal having a second pattern for the data channel to the UE;
wherein reference signal density of the second pattern is determined based on a coherence time of the data channel,
wherein resource elements of the second pattern are included in resource elements of the first pattern in a resource grid, and
wherein the second pattern is determined by eliminating at least one reference signal symbol from the first pattern according to a decreased level of Doppler frequency of the data channel.

2. The method according to claim 1, further comprising receiving information about the coherence time of the data channel from the UE.

3. The method according to claim 2, wherein the information about the coherence time of the data channel includes information about effective Doppler spread of the data channel.

4. The method according to claim 1, further comprising: receiving information about the second pattern from the UE.

5. The method according to claim 1, further comprising:
calculating effective Doppler spread of the data channel for the UE; and
determining the second pattern based on the effective Doppler spread.

6. The method according to claim 1, wherein the second pattern is defined as a hierarchical structure in which one or more reference signal symbols are eliminated from the first pattern in a time domain.

7. The method according to claim 1, wherein time-domain reference signal density of the first pattern is higher than time-domain reference signal density of the second pattern.

8. A method for receiving a reference signal from a base station (BS) at a user equipment (UE) in a wireless communication system, the method comprising:
receiving a control channel and the reference signal having a first pattern for the control channel from the BS; and
receiving a data channel and the reference signal having a second pattern for the data channel from the BS;
wherein reference signal density of the second pattern is determined based on a coherence time of the data channel,
wherein resource elements of the second pattern are included in resource elements of the first pattern in a resource grid, and
wherein the second pattern is determined by eliminating at least one reference signal symbol from the first pattern according to a decreased level of Doppler frequency of the data channel.

9. The method according to claim 8, further comprising transmitting information about the coherence time of the data channel to the BS.

10. The method according to claim 9, wherein the information about the coherence time of the data channel includes information about effective Doppler spread of the data channel.

11. The method according to claim 8, further comprising: transmitting information about the second pattern to the BS.

12. The method according to claim 8, wherein the second pattern is defined as a hierarchical structure in which one or more reference signal symbols are eliminated from the first pattern in a time domain.

13. The method according to claim 8, wherein time-domain reference signal density of the first pattern is higher than time-domain reference signal density of the second pattern.

14. A base station (BS) in a wireless communication system, the BS comprising:
a radio frequency (RF) unit; and
a processor connected with the RF unit and configured to transmit a control channel and the reference signal having a first pattern for the control channel to a user equipment (UE) and to transmit a data channel and the reference signal having a second pattern for the data channel to the UE,
wherein reference signal density of the second pattern is determined based on a coherence time of the data channel,
wherein resource elements of the second pattern are included in resource elements of the first pattern in a resource grid, and
wherein the second pattern is determined by eliminating at least one reference signal symbol from the first pattern according to a decreased level of Doppler frequency of the data channel.

15. A user equipment (UE) in a wireless communication system, the UE comprising:
a radio frequency (RF) unit; and
a processor connected with the RF unit and configured to receive a control channel and the reference signal having a first pattern for the control channel from a base station (BS) and to receive a data channel and the reference signal having a second pattern for the data channel from the BS,
wherein reference signal density of the second pattern is determined based on a coherence time of the data channel,
wherein resource elements of the second pattern are included in resource elements of the first pattern in a resource grid, and
wherein the second pattern is determined by eliminating at least one reference signal symbol from the first pattern according to a decreased level of Doppler frequency of the data channel.

* * * * *